Oct. 9, 1951     E. F. QUINTEROS     2,570,710
PULVIOMETER
Filed Dec. 3, 1948
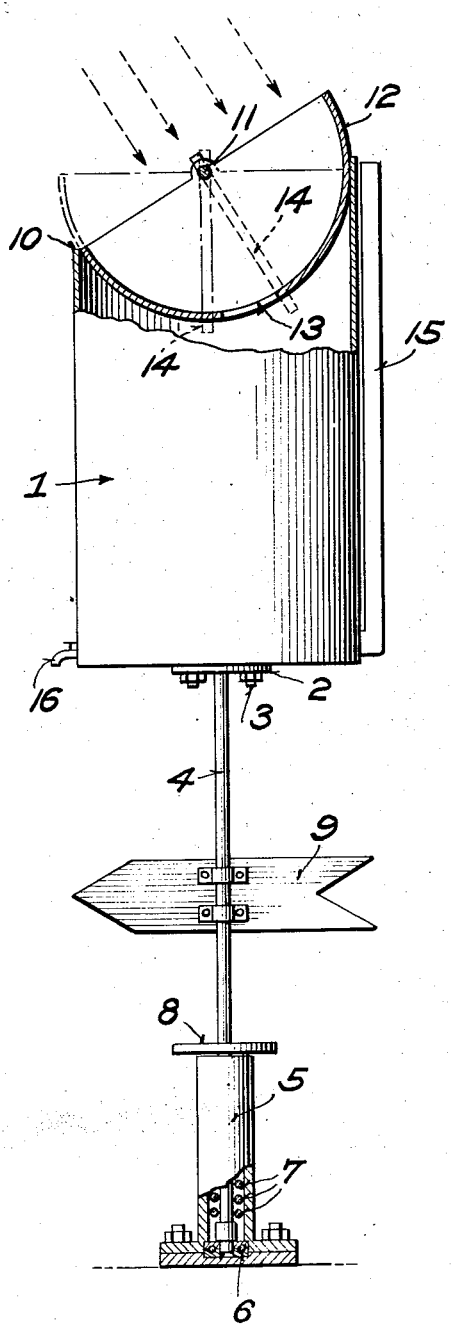
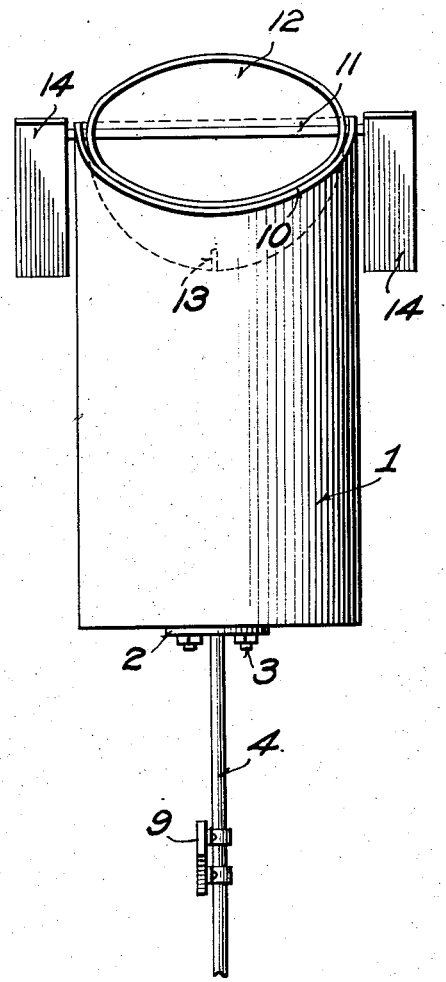
INVENTOR
EDUARDO F. QUINTEROS,
BY
ATTORNEY Patented Oct. 9, 1951

2,570,710

UNITED STATES PATENT OFFICE 2,570,710

PLUVIOMETER

Eduardo Faustino Quinteros, Cordoba, Argentina

Application December 3, 1948, Serial No. 63,398

2 Claims. (Cl. 73—171)

The present invention refers to improvements in pluviometers, its main object being to provide an apparatus for measuring rainfall in cases where same takes place in a calm atmosphere or in one suffering light or heavy currents of wind.

Another object of the invention is to provide a simple and practical construction which readily adjusts itself according to wind direction so that its opening is maintained in a plane which is perpendicular to the direction in which the rain is falling.

The invention likewise envisages other accessory objects, as will be made clear during the course of the present description.

In order that the present invention may be more clearly understood and readily put into practice, same will now be described with reference to attached drawing, illustrating a preferred embodiment of the apparatus in question.

In the drawings:

Figure 1 is a lateral elevational view of the pluviometer according to the present invention, partially cut away to show the main constituent parts of same, and Figure 2 is a front partial view of the same apparatus.

Like numerals represent like or similar parts throughout the several figures of the drawing.

In a preferred embodiment incorporating the improvements object of the present invention, the pluviometer consists of a collecting receptacle 1, preferably of cylindrical shape and fixed by its lower base, with the aid of plate 2 and bolts 3, to a vertical shaft 4. This shaft, in turn, is dismountably arranged within a tubular supporting base 5, its end being conveniently journalled in a flat bearing 6 which allows said shaft 4 to turn in one or the other direction. On the other hand, also for facilitating a free rotative movement, a number of balls 7 has been arranged within the base tube 5, surrounding the extremity of said shaft 4. A disc 8 mounted on the same shaft and near to the outlet opening of said tube support, serves to cover the latter and enables the means of rotation to be duly lubricated through the small separation existing between parts 5 and 8.

A thin sheet 9, properly secured to the middle portion of aforementioned shaft 4, forms the rotation impelling means of the pluviometer, inasmuch as said sheet acts as a weather vane, its purpose, as will be made clear later on, being to keep the inlet opening of the apparatus directed towards the wind.

The inlet or free end of said collector 1 is mitred as at 10, starting from the middle portion of said inlet opening, so as to be joined at an angle with the horizontal section of same; at this meeting point a cross shaft 11 has been arranged, rotatably mounted thereon and serving to support a cup consisting of a hemisphere 12 having a slotted opening 13 adjacent the bottom thereof. Said cross shaft 11 passes through the wall of receptacle 1 and the extremities thereof are equipped with blades 14, fixed thereto.

The collecting receptacle is also provided with a measuring tube 15 in communication therewith and parallel to a generatrix of same, said tube being duly graduated according to a scale capable of indicating the amount of liquid contained by the receptacle. A cock 16 will enable the latter to be wholly or partially drained of its contents.

The above described pluviometer operates in a very simple manner, combined with maximum efficiency. In fact, supposing the rainfall to be vertical, collecting cup 12 will keep its inlet opening in a totally horizontal position, as is shown in broken lines in Figure 1; consequently, blades 14 will be vertically placed, i. e., parallel to the axis of said receptacle. Part of the rainwater is thus totally admitted in that receptacle or cup 12 and passes through hole 13 into aforementioned receptacle 1.

During a fall of rain impelled by wind, the assembly as described will be turned by weather vane 9, until it comes to occupy a position contrary to the direction of the wind. Under these circumstances, the mitred portion 10 of receptacle 1 will also face the wind. In this manner, blades 14 are impelled and obliged to incline in accordance with the direction of the falling rain which, logically, is that of the prevailing wind. It can now clearly be seen that the direction of the blades is transmitted to the cup or receptacle 12, the inlet opening of same being thus perpendicular to the direction of the fall of rain. In this manner, independent of the direction of the fall and the strength of the wind, receptacles 1 and 12 will always be facing said directions, the falling water being thus enabled properly to enter into same.

The invention as described and illustrated may be clearly understood and no further explanations will be required by those versed in the matter.

As the invention herein shown and specified has been described in the manner of a preferred embodiment which is to be considered as an illustrative example and in no ways as a limitation upon the invention, same may be subjected to changes in its construction and details without thereby departing from its essential nature, as clearly defined in the following claims.

I claim:

1. A rain gauge comprising, in combination, a tubular base, a shaft rotatably mounted in said base, a wind direction vane fixed to said shaft, a plate horizontally affixed to the upper end of said shaft, a receptacle having an open top and a closed bottom mounted on said plate, said receptacle having oppositely disposed openings in its side walls adjacent the bottom, measuring means communicating with one of said openings, draining means communicating with the other of said openings for removing the water held by said receptacle, a cup member having an opening in its lower wall, a cross shaft pivotally mounting said cup member in the open top of said receptacle and extending through the upper side walls of said receptacle, cup tilting vanes mounted on the ends of said cross shaft and adapted to tilt said cup member in the direction of the prevailing wind.

2. A rain gauge comprising, in combination, a base including a tubular portion, a shaft rotatably mounted coaxially with said tubular portion, a disc on the shaft forming a cover for the open end of said tubular portion, a wind direction vane supported on the medial portion of said shaft, a container mounted on the upper end of said shaft and having an open top and a closed bottom, one edge of the top of the container being cut away downwardly from the main upper edge of the container, a gauge tube paralleling the outside of the container and communicating at its lower end with the bottom of said container, a rain fall collecting cup pivotally mounted at the open top of the container and having a bottom discharge opening, and wind responsive vanes at each side of the container and connected with a pivoting axis of said cup, said vanes in response to wind pressure tilting the cup in the direction of the cut-away portion of the container.

EDUARDO FAUSTINO QUINTEROS.

REFERENCES CITED

The following references are of record in the file of this patent:

UNITED STATES PATENTS

| Number | Name | Date |
|---|---|---|
| 916,060 | Thompson | Mar. 23, 1909 |
| 1,153,355 | Tredway | Sept. 14, 1915 |
| 1,407,068 | Johnson | Feb. 21, 1922 |
| 1,942,039 | Tyler | Jan. 2, 1934 |
| 2,384,954 | Moore | Sept. 18, 1945 |
| 2,497,759 | Cappleman, Jr. | Feb. 14, 1950 |